United States Patent [19]

Foster et al.

[11] 3,894,965

[45] July 15, 1975

[54] PROCESS FOR DEPOSITING NOBLE METAL CATALYSTS

[75] Inventors: Gordon F. Foster, Campbell; Helmuth E. Meissner, Painted Post; Janice L. Stiles, Corning, all of N.Y.

[73] Assignee: Corning Glass Works, Corning, N.Y.

[22] Filed: Nov. 9, 1973

[21] Appl. No.: 414,251

Related U.S. Application Data

[63] Continuation-in-part of Ser. No. 243,416, April 12, 1972, abandoned.

[52] U.S. Cl............ 252/460; 252/466 PT; 252/470; 252/471; 252/472; 252/477 R
[51] Int. Cl..... B01j 11/08; B01j 11/06; B01j 11/22
[58] Field of Search...... 252/460, 466 PT, 472, 451, 252/470, 477 R

[56] References Cited
UNITED STATES PATENTS

| | | | |
|---|---|---|---|
| 2,623,860 | 12/1952 | Haensal | 252/460 X |
| 3,489,692 | 1/1970 | Bourne et al. | 252/466 PT |
| 3,554,929 | 1/1971 | Aarons | 252/463 X |
| 3,565,830 | 2/1971 | Keith et al. | 252/477 R |
| 3,785,781 | 1/1974 | Hervert et al. | 252/477 R |
| 3,785,998 | 1/1974 | Hoekstra | 252/477 R |

*Primary Examiner*—Carl F. Dees
*Attorney, Agent, or Firm*—Kees van der Sterre; Clinton S. Janes, Jr.; Clarence R. Patty, Jr.

[57] ABSTRACT

A process for depositing a noble metal catalyst on an oxide support material comprising contacting the support material with an alkaline solution of complex noble metal-amine cations under prescribed pH conditions is disclosed. The process is particularly suitable for depositing catalysts on monolithic honeycomb support structures because the catalyst dispersions produced thereby are extremely uniform on the interior channel walls of the structure.

2 Claims, No Drawings

PROCESS FOR DEPOSITING NOBLE METAL CATALYSTS

This application is a continuation-in-part of our copending application Ser. No. 243,416, filed Apr. 12, 1972, now abandoned.

BACKGROUND OF THE INVENTION

The present invention has general applicability in the field of supported noble metal catalysts systems and special applicability in the field of supported noble metal catalysts for the treatment of waste gases, particularly automotive exhaust gases. It is presently desired to produce small catalytic units for use in automobiles to control harmful exhaust emissions such as carbon monoxide, unburned hydrocarbons and oxides of nitrogen. To meet government pollution control regulations, such units must attain a very high degree of catalytic efficiency under conditions quite adverse to catalytic activity and stability.

One promising approach to the automotive emissions control problem has been the use of noble metal catalysts supported on monolithic honeycomb support structures situated in the exhaust system. These structures provide advantages of convenience, compact size and high surface area-to-weight ratios which are helpful in maximizing gas-catalyst contact and, thus, the efficiency of the catalytic unit.

A large number of noble metal catalysts and mixtures have been considered for use in combination with monolithic support structures, and investigation as to the effects of catalyst composition on catalytic stability and efficiency in the exhaust environment has been extensive. In addition, a great deal of attention has been directed to the use of various oxide support materials as coatings on monolithic support structures to further promote and stabilize catalytic activity. Nevertheless, it is well known that, together with the nature of the catalyst and the catalyst support coating, the method of depositing the catalyst is a most important variable affecting the stability and selectivity of a given catalyst system.

The method of deposition is of particular importance where noble metal catalysts and monolithic support structures are concerned because of the problems encountered when it is attempted to employ conventional simple impregnation techniques to uniformly distribute noble metal catalysts on the interior channel walls of a honeycomb structure. Because of differences in liquid evaporation rates between the exterior and interior surfaces of such structures, dissolved catalyst compounds tend to migrate to the exposed exterior surfaces of the monolith, resulting in highly nonuniform catalyst distribution. This problem is especially severe with noble metal catalysts because the solutions employed to deposit noble metals typically contain only minor concentrations of these materials. This is because the cost of noble metals makes low catalyst loadings highly desirable; however, extremely uniform dispersion is required with low catalyst loadings to produce a sufficiently active catalytic unit.

It is the principal object of the present invention to provide a solution to the aforementioned problems in the form of a process for uniformly dispersing minor amounts of noble metal catalysts on oxide catalyst support materials, particularly on oxide catalyst support materials in the form of monolithic support structures or coatings thereon.

It is a further object of the present invention to provide a process for the quantitative deposition of noble metals from noble metal solutions containing only minor concentrations of metal in the form of a uniform dispersion on an oxide catalyst support.

Other objects and advantages of the present invention will become apparent from the following description and detailed examples thereof.

SUMMARY OF THE INVENTION

Our invention includes a process for depositing noble metal catalysts on certain oxide catalyst support materials comprising the step of contacting an oxide support material with an alkaline aqueous solution of complex noble metal-amine cations under pH conditions such that the complexed noble metal cations will be adsorbed onto the surface of the oxide support. Oxide support materials which may be treated according to the process of the present invention include at least partially-hydrated 3- or higher-valent metal oxides such as $La_2O_3$, $Al_2O_3$, $Cr_2O_3$, $Mn_2O_3$, $TiO_2$, $ZrO_2$, $MnO_2$, $SiO_2$, $SnO_2$, $ThO_2$ and $Mn_3O_4$. Partial hydration implies the presence on the oxide support of at least some hydroxyl groups which act as adsorption sites to promote the adsorption of the desired complex cations.

Because of the requirement for adsorption sites, anhydrous or hydroxyl-free oxide support materials which are to be treated according to the process of the present invention should be at least partially rehydrated to promote good adsorption. This will occur to some degree during contact with the aqueous alkaline catalyst solution, but it may be accelerated by a pretreatment comprising contacting the oxide with concentrated aqueous $NH_4^+$— containing solutions. Even in the case of hydrated oxides, this pretreatment may be advantageous because it leads to the formation of $NH_4^+$ sites on the oxide which promote catalyst adsorption through an ammonium-for-complexed catalyst cation exchange reaction.

The pH conditions of the deposition process are controlled by adjusting the pH of the catalyst solution to a value at least sufficient to permit the adsorption of the complexed noble metal cations onto the selected metal oxide upon contact therewith. Among the noble metal catalysts which may be suitably deposited according to the invention are platinum, palladium, rhodium, iridium and ruthenium.

Following the adsorption of the catalyst onto the oxide support material, the further steps of drying, reduction to the metallic state and firing to remove reaction by-products and bonded water may be accomplished using procedures known in the art. The resulting supported catalyst comprises a useful device for the treatment of waste gases or for a variety of other catalytic applications.

Although this type of catalyst deposition by adsorption results in a high degree of dispersion of noble metal catalyst, an even more effective dispersion may be achieved by applying the intended catalyst loading to the support structure not in a simple one-step process but in multiple steps, firing between the steps to decompose the noble metal compounds to the metal. Superior activity and stability of the noble metal catalyst can result from such a deposition method.

DESCRIPTION OF THE PREFERRED EMBODIMENTS

While the process of the present invention is generally useful for the deposition of noble metal catalysts on oxide support materials in any form, it is particularly useful in obtaining a uniform dispersion on monolithic honeycomb structures to be employed as catalyst supports. Examples of these structures and methods for preparing them are described in the patent to Hollenbach, U.S. Pat. No. 3,112,184. Typically, such honeycombs are formed of refractory ceramic or glass-ceramic materials composed of cordierite, spodumene, petalite, silica, alumina, zirconia, magnesia, titania or any other of a wide variety of crystalline or semicrystalline compounds or solid solutions of refractory metal oxides.

In cases where the selected support structure is composed of silica, alumina, zirconia, titania or any other of the 3- or higher-valent metal oxides which may be treated according to the present invention, noble metal catalysts may be directly deposited thereon employing the techniques and procedures herein disclosed. Ordinarily, however, the selected refractory support structure will be composed of a material of limited suitability as the sole catalyst support, and a suitable oxide support material in the form of a coating on the support structure will then be provided prior to treatment according to the process of the present invention.

Whether the oxide support material to be treated according to the invention is in the form of a coating on a refractory honeycomb structure or in any other form, it is desirable from the standpoint of catalyst dispersion that the surface area of the oxide support material be high. For example, we have found that surface areas as measured by standard B.E.T. nitrogen adsorption methods of about 10 to 20 square meters per gram should be provided to obtain relatively low noble metal loadings of about 0.1% by weight on a honeycomb support.

Although the coating of oxide support materials may be provided by anyone of the numerous means known in the art, particularly desirable coatings may be produced according to the methods described in the copending application of G. F. Foster and H. E. Meissner, Ser. No. 243,417, entitled "Support Coatings for Catalysts," commonly assigned herewith. Those methods generally comprise the in situ hydrolysis of metal alkoxide-coated monoliths to produce hydrous oxide coatings of very high surface area and porosity. Alternatively, we prefer to employ methods described in the copending application of G. F. Foster, H. E. Meissner and J. L. Stiles, Ser. No. 249,353, entitled "Process for Depositing Oxide Coatings," commonly assigned herewith. Those methods comprise the in situ precipitation onto a support structure of certain metals which form relatively insoluble hydroxides in the presence of excess $NH_4OH$. The disclosures of each of these two copending applications are expressly incorporated herein, and reference may be made thereto for further explanation of these matters.

While any of the at least partially-hydrated metal oxide support materials described above may be treated according to our process, we particularly prefer to treat supports composed of amphoteric hydrous oxides, oxihydrates, or hydroxides of 3-and 4-valent metals prepared by the processes described in the aforementioned applications, particularly including hydrous $CR_2O_3$, $MnO_2$, $Mn_3O_4$, $Mn_2O_3$, $TiO_2$, $ZrO_2$, $SiO_2$, $SnO_2$, $ThO_2$ and $Al_2O_3$. These may in certain instances be subjected to a heat treatment prior to the catalyst deposition to develop optimum pore structure and stability of the high surface area oxides. Such processes are shown in more detail in the examples of our invention which appear below.

Treatment of oxide support materials according to the process of the present invention involves contacting the selected support material with an alkaline aqueous solution of complex noble metalamine cations. Noble metal salts are known to form ammonia complexes with excess ammonium hydroxide or ammonium carbonate. Thus, solutions of complexed platinum, palladium, rhodium, iridium and ruthenium may be prepared by adding concentrated or somewhat diluted $NH_4OH$ to solid or dissolved noble metal chlorides such as $H_2PtCl_6.6H_2O$, $PdCl_2$, $(NH_4)_2PtCl_6$, $RhCl_3.3H_2O$, $IrCl_3.H_2O$, $(NH_4)_2IrCl_6$ or $RuCl_3.H_2O$, or in some cases with nitrate compounds of these metals. Typically, ammonium hydroxide solutions wherein the weight ratio of concentrated ammonium hydroxide to water ranges from about 1 to 4 to about 1 to 9 are employed. An initially-formed precipitate with the ammonia-alkaline solution disappears during digestion of the resulting suspension at 80°–100°C. for 4–6 hours. Means such as covered containers should be provided for controlling the volatilization of ammonia during the digestion process. The resulting solutions are stable after cooling to room temperature.

The concentration of amine-complexed noble metal ions in the alkaline solution is not critical to the effectiveness of the deposition procedure; adsorption of cations will occur under the prescribed conditions until limited either by the absence of sufficient adsorption sites on the support under treatment or the depletion of complexed catalyst cations from the solution. We prefer to limit the volume of the solution to that just sufficient to completely contact the support structures to be treated, and to limit the catalyst concentration to that amount of catalyst required or attainable with the selected catalytic system to be produced.

Quantitative or nearly-quantitative adsorption of the noble metal from the solution is particularly desirable from the standpoint both of cost and control of catalyst loading, and we have found that quantitative adsorption of noble metal catalysts in amounts ranging from about 0.5–1.0% by weight of the selected honeycomb support structure may be routinely obtained with certain of our preferred amphoteric hydrous oxide support materials. Such catalyst loadings are more than sufficient to produce an extremely active catalytic unit when dispersed with the uniformity attainable with our process.

Table I below shows several examples of quantitative deposition for some representative catalysts and oxide supports. The alumina and zirconia oxide supports were deposited on the refractory support structures by the in situ hydrolysis of aluminum and zirconium alkoxides, while the $Mn_3O_4$ support was deposited by precipitation with ammonium hydroxide. Table I shows the composition of the support structure and the support coating, the catalyst employed, the desired catalyst loading, expressed in percent by weight of the oxide-coated support structure, the amount of metal in the alkaline amine solution, and the amount of metal actually deposited on the oxide-coated support structure. All of the amine solutions were prepared by mixing weighed amounts of noble metal compounds with ammonium hydroxide solutions containing concentrated ammonium hydroxide and water in a weight ratio of about 1 to 4. The two-component oxide support coatings shown are layered coatings composed of a base layer of alumina and a covering layer of either zirconia or manganese oxide.

TABLE I

| Support Structure Composition | Support Coating | Catalyst Composition (weight %) | Catalyst Loading (weight %) | Catalyst in Solution (grams) | Catalyst on Sample (grams) |
|---|---|---|---|---|---|
| cordierite | $Al_2O_3$-$ZrO_2$ | Pt | 0.2 | 0.040 | 0.0397 |
| cordierite | $Al_2O_3$-$Mn_3O_4$ | Pt | 0.2 | 0.040 | 0.040 |
| cordierite | $Al_2O_3$-$Mn_3O_4$ | Pt | 0.5 | 0.100 | 0.100 |
| alumino-silicate | none | Pt-30% Rh | 0.2 | 0.794 (Pt) | 0.790 |
|  |  |  |  | 0.340 (Rh) | 0.339 |
| cordierite | $Al_2O_3$ | Pt | 0.2 | 0.040 | 0.0383 |

The results shown in Table I are readily reproducible with our preferred hydrated alumina, zirconia, silica or $Mn_3O_4$ support materials at loadings below about 0.5% by weight of either platinum, ruthenium, rhodium or iridium. Palladium complexes tend to be adsorbed somewhat less completely, and certain other hydrated oxides do not provide quite as efficient adsorption, but useful catalyst loadings may be obtained with any of the catalyst-support systems herein disclosed.

Our preferred amphoteric hydrated oxide support materials may act either as cation or anion adsorbers depending upon the pH of the solution, the degree of basicity of the metal ions making up the oxide, and the strength of the metal-oxygen bond relative to the oxygen-hydrogen bond of the hydrated oxide in an aqueous environment. The pH value of the zero-point-of-charge of the support with respect to $H^+$ and $OH^-$ ions in the aqueous environment represents the borderline between acid and base properties. At pH values below the zero-point-of-charge, anions are preferentially adsorbed, while at pH values above this point cations are adsorbed. While there is no abrupt change between adsorption of cations and adsorption of anions to the support surface, it will be appreciated that the adsorption of cationic noble metal-amine complexes will be favored and will occur more extensively in highly alkaline solutions. Thus, while the pH value of the alkaline solution should normally be at least sufficient to permit the adsorption of cations onto the selected oxide support material, it is preferred that the selected pH value be above the value associated with the zero-point-of-charge of the selected catalyst support material. Alkaline solutions wherein the pH value ranges from about 10 to about 11.5 are particularly preferred. The pH values associated with the zero-point-of-charge are given in the literature for many of our oxide support materials, but the values for some of our preferred materials are reproduced below in Table II:

TABLE II

| Oxide Support Material | pH Value Associated with Zero-Point-Of-Charge |
|---|---|
| $Al_2O_3$ | 9.1 ($\alpha$-$Al_2O_3$) |
| $TiO_2$ | 6 |
| $ZrO_2$ | 4 |
| $MnO_2$ | 3 |
| $SiO_2$ | 2 |
| $SnO_2$ | 4.5 |

Although there is some evidence that the adsorption of complex noble metal-amine cations onto the support oxide proceeds quite rapidly upon initial contact with the alkaline solution, particularly in the preferred pH ranges, a better degree of dispersion can often be achieved by redistribution reactions which occur over longer time periods. For this purpose, contact with the alkaline amine solution may usefully be continued for periods up to about 24 hours.

An optional but often-employed further step in our deposition process involves the pretreatment of the oxide support coating with concentrated aqueous solutions of ammonium compounds. This procedure facilitates catalyst adsorption, particularly in the case of the less reactive anhydrous oxides, by promoting rehydration and the formation of $O^-NH_4^+$ sites from $O^-H^+$ sites on the support material. Upon later contact between the pretreated oxide support and the alkaline-amine catalyst solution, adsorption of the catalyst proceeds quite readily through an ammonium-for-complexed catalyst cation exchange reaction. Typically, our pretreatment step comprises contacting the oxide support material with a concentrated ammonium hydroxide-water mixture (concentrated $NH_4OH$ to $H_2O$ ratio about 1 to 1 by weight) by immersion at room temperature for 24 hours. Of course, shorter treatments for periods of time at least sufficient to cause some adsorption of $NH_4^+$ ions are also useful, and concentrated solutions containing other ammonium compounds such $NH_4NO_3$ or $(NH_4)_2CO_3$ may be substituted for the concentrated ammonium hydroxide solution, if desired. In addition, the effect of pretreatment may be incidentally obtained through the use of certain of our oxide deposition procedures involving alkoxide hydrolysis or hydroxide precipitation with $NH_4OH$, since these procedures inherently result in the presence of some $NH_4^+$ sites on the support coating.

Since our alkaline noble metal-amine solutions are capable of dissolving certain amounts of support oxides such as silica and, to a lesser extent, alumina from the coating, it is in many cases desirable to rinse any excess catalyst solution from the oxide support after the adsorption treatment is concluded. In this way, evaporation of the depleted catalyst solution and precipitation of dissolved oxide back onto the adsorbed catalyst is prevented, and optimum catalytic activity will be assured in the completed unit.

Following rinsing, the support with adsorbed catalyst may be dried and subjected to reducing treatments to convert the catalyst to the metallic state by any of the various procedures known in the art. We prefer to carry out the drying step at moderately elevated temperatures, e.g., 80°C., to accelerate the evaporation process. Drying is then followed by further heating at about 300°C. in a vacuum for at least about an hour to remove the water of hydration from the oxide support material, reduction of the catalyst at 300°C. for an hour with flowing forming gas (90% $N_2$, 10% $H_2$ by volume), and gradual cooling of the support to about 100°C. prior to use. Experimental results indicate, however, that the above heating schedule does not have a critical relationship to the catalytic activity and stability of the final supported catalyst system, and any treatment which will immobilize the catalyst and dehydrate the coating without affecting the uniformity of the catalyst dispersion may alternatively be employed.

The following detailed examples more completely illustrate the preparation of an active catalytic device using the catalyst deposition process of the present invention. These examples are, of course, not limiting as to the scope of the present invention but are rather merely illustrative of the kinds of techniques which may be employed in carrying out our process.

EXAMPLE I

A monolithic cordierite ceramic structure of cylindrical shape with about 1 inch diameter and 2-5/16 inch height, comprising about 200 cells per square inch of cross sectional area, was coated with 1.18 grams of hydrous silica by impregnation of the porous structure with silicon tetra methoxide, precipitation of hydrous silica with ammonium hydroxide, and drying at 80°C. for 2 hours.

The sample was then treated in a solution prepared from equal weights of concentrated $NH_4OH$ and $H_2O$ for 24 hours at room temperature. Thereafter it was rinsed in $H_2O$, and transferred into 30 cc of a solution containing Pt- and Rh-amine complex ions in a tight-fitting container such that it was completely covered. The catalyst-containing solution was prepared by dissolving 0.0637 grams of $(NH_4)_2PtCl_6$ and 0.0307 grams of $RhCl_3.3H_2O$ in a solution composed of 1 part concentrated $NH_4OH$ and 9 parts $H_2O$ by weight, digesting at 80°–90°C. for several hours in a covered container. The volume of this solution was adjusted to 30 cc by the addition of more of the $NH_4OH$ solution, with the total platinum content of the solution being 0.028 grams and the total rhodium content being about 0.012 grams.

After contacting the sample with this catalyst solution for 24 hours at room temperature, the sample was removed, washed with $H_2O$, and dried at 120°C. for 2 hours. Virtually all of the noble metal was evenly adsorbed in the form of amine-complexed cations onto the silica coating of the support structure. Then the sample was transferred to a furnace where it was heated in vacuum to 300°C. A gas mixture consisting of 90% nitrogen and 10% hydrogen was introduced at 300°C., and a low flow rate through the sample was maintained for 1 hour. Then the sample was allowed to cool. This heat treatment resulted in the decomposition of the noble metal compound to reduced noble metal and volatilized, undesirable reaction by-products. The device thus produced had a noble metal dispersion composed of about 70% platinum and 30% rhodium which comprised about 0.2% by weight of the structure, evenly distributed over the surface thereof. It was quite useful for the catalytic treatment of gases.

EXAMPLE II

A cordierite ceramic monolithic substrate of cylindrical shape (1 inch diameter and 2-5/16 inch height) with about 200 parallel channels per square inch of cross sectional area was coated with high-surface-area alumina by repeated immersion into a melt of aluminum isopropoxide at 100°–120°C. and subsequent hydrolysis in a steam atmosphere at 120°C. (at 18 psi) for 30 minutes. After heating the sample to 600°C. for 2 hours, a weight increase of 1.25 grams due to the alumina coating was observed.

A coating of manganese oxide ($Mn_3O_4$) was applied on top of the alumina by impregnating the sample with a 50% solution of manganous nitrate, removing excess solution, and precipitating hydrated manganese oxide with a mixture composed of equal weights of concentrated $NH_4OH$ and water. After firing for 4 hours to 500°C., a weight gain of 1.81 grams was observed.

The sample was then treated with a solution composed of equal weights of concentrated $NH_4OH$ and water for 24 hours, and thereafter immersed in a catalyst solution containing 0.040 grams of platinum which was prepared from 0.0910 grams of $(NH_4)_2PtCl_6$ and about 30 cc of ammonium hydroxide solution according to the procedure described in Example I. After 24 hours of immersion in this solution, the sample was removed, washed, dried and fired according to the procedure of Example I. Quantitative adsorption of the platinum in solution resulted in a catalytically active dispersion comprising about 0.2% by weight of the honeycomb structure.

EXAMPLE III

Two honeycomb cordierite monolithic support structures of cylindrical shape (3 inch height and 3.6 inch diameter) with about 200 parallel channels per square inch of cross sectional area, are coated with high-surface-area alumina by immersion into a melt of aluminum isopropoxide at 100°–120°C. and subsequent hydrolysis in a steam atmosphere at 120°C. (18 psi) for 30 minutes. After steam treatment, the samples are heated to 600°C. for 2 hours to convert the coating to alumina.

The alumina-coated monoliths prepared as described are provided with a platinum catalyst. One monolith is platinum-coated by a prior art process comprising immersion in an aqueous chloroplatinic acid solution for several minutes, removal and shaking to remove excess solution, drying at 190°C. for several minutes to remove water, and firing at 600°C. for one hour to convert the chloroplatinic acid to platinum. The platinum loading by this process is 0.037 grams of Pt per cubic inch of monolithic support.

The second alumina-coated monolithic support is provided with a platinum coating according to the procedure described above in Example II, wherein it is immersed in a solution of $(NH_4)_2PtCl_6$ in aqueous ammonium hydroxide (1 part $NH_4OH$ and 9 parts $H_2O$ by weight) for 24 hours, removed and washed with $H_2O$, dried at 120°C. for 2 hours, and fired at 300°C. in a reducing atmosphere. The platinum loading by this process is 0.024 grams of platinum per cubic inch of monolithic support.

Comparison of the catalytic efficiencies of prior art and ion-exchanged honeycomb devices such as above described indicate that devices prepared according to the prior art process do not typically demonstrate the increased hydrocarbon and carbon monoxide oxidation activity which would be expected in view of the substantially increased (150%) concentration of platinum thereon. In addition, their resistance to degradation upon exposure to elevated temperatures (e.g. 800°C.) is less than would be expected.

Investigation of the causes of these deficiencies discloses that there is a substantial maldistribution of platinum throughout the volume of the honeycomb device prepared according to the prior art process. Visual inspection shows that, when split parallel to the cylinder axis, the honeycomb has dark edges but a very light-colored core, indicating serious migration of the platinum to the exposed drying surfaces of the device. This visual indication is confirmed by wet chemical analysis showing platinum concentrations as low as .011 grams per cubic inch at the core of the device and concentrations as high as 0.087 grams per cubic inch at the periphery.

In contrast to the above findings, examination of the honeycomb device prepared according to the invention shows a surprisingly uniform distribution of platinum on the interior channel walls of the honeycomb throughout the volume of the device. Hence, measurements on this device indicate that, in a honeycomb wherein the nominal platinum loading is about 0.024 grams of platinum per cubic inch of honeycomb volume, concentration variations throughout the volume of the device may be routinely held within the range of about 0.022–0.024 grams of platinum per cubic inch of volume, if desired. The advantages in terms of efficient usage of expensive noble metal catalysts are readily apparent.

The foregoing examples clearly illustrate the utility of our process to apply minor amounts of noble metal catalysts in the form of extremely uniform dispersions, particularly in the case of monolithic support structures of the honeycomb type which have proven difficult to coat uniformly using prior art processes. Our process, therefore, represents a useful advance in the field of noble metal catalyst deposition techniques.

We claim:

1. In a process for the deposition of a noble metal catalyst on a refractory monolithic honeycomb support structure which comprises the steps of providing at least the interior channel walls of the structure with an oxide support coating, applying a solution of a noble metal compound to the oxide-coated structure, drying the structure, and treating the structure with a reducing agent to reduce the noble metal compound to the metallic state, the improvement which comprises:

a. providing in substitution for said oxide support coating a coating consisting of at least one amphoteric hydrous oxide, oxihydrate or hydroxide selected from the group consisting of hydrous $Cr_2O_3$, $MnO_2$, $Mn_3O_4$, $Mn_2O_3$, $TiO_2$, $ZrO_2$, $SiO_2$, $SnO_2$, $ThO_2$ and $Al_2O_3$ on the interior channel walls of said structure;

b. immersing said structure and coating into a catalyst solution consisting essentially of water, ammonium hydroxide and at least one noble metal compound selected from the group consisting of compounds of platinum, palladium, rhodium, iridium and ruthenium which form complex noble metal amine cations in ammonia alkaline solutions, said catalyst solution containing ammonium hydroxide in an amount sufficient to bring the pH of said catalyst solution within the range of about 10–11.5;

c. removing said structure from said catalyst solution and removing excess catalyst solution from said structure by rinsing;

d. drying said structure; and e. treating said structure with a reducing agent to reduce the noble metal compounds thereon to the metallic state.

2. A process for obtaining quantitative adsorption of a noble metal catalyst from a catalyst solution onto a refractory monolithic honeycomb support structure which comprises the steps of:

a. providing a coating consisting of at least one amphoteric hydrous oxide, oxihydrate or hydroxide selected from the group consisting of hydrous $Al_2O_3$, $ZrO_2$, $SiO_2$ and $Mn_3O_4$ on at least the interior channel walls of said structure;

b. immersing said structure and coating into a catalyst solution consisting essentially of water, ammonium hydroxide, and at least one noble metal compound selected from the group consisting of compounds of platinum, ruthenium, rhodium and iridium which form complex noble metal amine cations in ammonia alkaline solutions, said noble metal compound being present in said catalyst solution in an amount sufficient to provide a weight of noble metal constituting about 0.2–0.5% of the weight of said structure, and ammonium hydroxide being present in said catalyst solution in an amount sufficient to bring the pH of said catalyst solution within the range of 10–11.5, and said solution having a volume just sufficient to completely contact said structure;

c. removing said structure from said catalyst solution and removing excess catalyst solution from said structure by rinsing;

d. drying said structure; and e. treating said structure with a reducing agent to reduce noble metal compounds thereon to the metallic state.

* * * * *